United States Patent
Aljundi

(10) Patent No.: US 12,121,868 B2
(45) Date of Patent: *Oct. 22, 2024

(54) DOUBLY POROUS MULTI-LAYER DESAL MEMBRANE

(71) Applicant: KING FAHD UNIVERSITY OF PETROLEUM AND MINERALS, Dhahran (SA)

(72) Inventor: Isam Hassan Aljundi, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/603,332

(22) Filed: Mar. 13, 2024

(65) Prior Publication Data

US 2024/0261739 A1    Aug. 8, 2024

Related U.S. Application Data

(63) Continuation of application No. 16/655,899, filed on Oct. 17, 2019, now Pat. No. 11,969,696.

(51) Int. Cl.
*B01D 69/12* (2006.01)
*B01D 71/44* (2006.01)
(Continued)

(52) U.S. Cl.
CPC ............ *B01D 69/125* (2013.01); *B01D 69/12* (2013.01); *B01D 71/441* (2022.08); *B01D 71/62* (2013.01);
(Continued)

(58) Field of Classification Search
CPC ............ B01D 2323/12; B01D 2323/40; B01D 2325/02; B01D 67/0006; B01D 69/12;
(Continued)

(56) References Cited

U.S. PATENT DOCUMENTS

| 7,913,857 | B2 | 3/2011 | Koo et al. |
| 8,603,340 | B2 | 12/2013 | Kurth et al. |
| 2017/0014779 | A1 | 1/2017 | Jeon |
| 2019/0388844 | A1* | 12/2019 | Minehara ............... B01D 69/12 |

FOREIGN PATENT DOCUMENTS

| CN | 101559334 B | 5/2012 |
| CN | 105617875 A | 6/2016 |

(Continued)

OTHER PUBLICATIONS

Yufeng Zhang, et al., Investigations on the structures and performances of a polypiperazine amide/polysulfone composite membrane, *Elsevier*, Desalination 191 (2006) 291-295, www.elsevier.com/locate/desal, 5 pages.

(Continued)

*Primary Examiner* — Latosha Hines
(74) *Attorney, Agent, or Firm* — Oblon, McClelland, Maier & Neustadt, L.L.P.

(57) ABSTRACT

A multi-layer membrane which has a mixed polyamide selective layer supported on a porous polysulfone layer. The mixed polyamide selective layer includes reacted units of a polyfunctional acyl halide (e.g. trimesoyl chloride) and a diamine mixture containing 4,7,10-trioxa-1,13-tridecanediamine and a cyclic diamine (e.g. piperazine). Methods of fabricating the multi-layer membrane via techniques such as phase inversion and interfacial polymerization are described. The inventive membrane is evaluated on its water flux and salt rejection (e.g. sulfate and chloride salts) capabilities. A water desalination system containing the multi-layer membrane(s) is also provided.

14 Claims, 3 Drawing Sheets

(51) Int. Cl.
  *B01D 71/62* (2006.01)
  *B01D 71/68* (2006.01)
  *C02F 1/26* (2023.01)
  *C02F 103/08* (2006.01)

(52) U.S. Cl.
  CPC .............. *B01D 71/68* (2013.01); *C02F 1/265* (2013.01); *B01D 2323/40* (2013.01); *B01D 2325/0283* (2022.08); *C02F 2103/08* (2013.01)

(58) Field of Classification Search
  CPC .... B01D 69/1251; B01D 71/28; B01D 71/44; B01D 71/56; B01D 71/62; B01D 71/68; C02F 1/265; C02F 1/44; C02F 1/442; C02F 2103/08
  See application file for complete search history.

(56) References Cited

FOREIGN PATENT DOCUMENTS

| | | | |
|---|---|---|---|
| IN | 244150 | 11/2010 | |
| WO | WO 2012/102678 A1 | 8/2012 | |
| WO | WO-2018143297 A1 * | 8/2018 | ............. B01D 69/02 |

OTHER PUBLICATIONS

Aoling Zhang, et al., Preparation polyamide nanofiltration membrane by interfacial polymerization, *Desalination and Water Treatment*, 37 (2012) 238-243, Jan., 1944-3994/1944-3986 © 2012 Desalination Publications, www.deswater.com, 6 pages.

* cited by examiner

DOUBLY POROUS MULTI-LAYER DESAL MEMBRANE

CROSS-REFERENCE TO RELATED APPLICATIONS

The present application is a Continuation of U.S. application Ser. No. 16/655,899, pending, having a filing date of Oct. 17, 2019.

BACKGROUND OF THE INVENTION

Technical Field

The present disclosure relates to a membrane having a selective polyamide layer disposed on a porous polysulfone support layer. The present disclosure also relates to a method of producing the membrane and a water desalination system containing the membrane.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

High concentrations of sulfates in the Arabian Gulf seawater can lead to scale formation when used in water flooding processes, which requires costly mitigation. At high sulfate concentration scale inhibitors are ineffective and scale accumulation necessitates permanent decommission of the oil well.

To meet the rapidly growing demand on natural gas, hydraulic fracturing activities in tight gas wells have been increasing exponentially in Saudi Arabia. Up to 125,000 gallons of groundwater are used as fracturing fluid during each fracturing stage. Because of a fresh water shortage, reducing groundwater usage in hydraulic fracturing has become an important research topic. Other water sources, such as seawater, have been explored as an alternative fracturing fluid. However, high sulfate content in seawater leads to scale precipitation and is potentially incompatible with the use of formation water. Without proper prevention and mitigation measures, scale precipitation can lead to formation damage and reduction in fracture conductivity [Seawater Based Fracturing Fluid: A Game Changer in Hydraulic Fracturing Applications in Saudi Arabia, A. Abdul Majid, Society of Petroleum Engineers, SPE Middle East Oil & Gas Show and Conference, Mar. 6-9, 2017, Manama, Kingdom of Bahrain, document ID: SPE-184015-MS]. A potential solution to this issue is to eliminate or reduce sulfate salt content in seawater prior to injection into the reservoir via membrane separation technology [High recovery sulfate removal process, Gerald Alexander, Stanley R. Karrs, Richard Woodling, and Karthikeyan Sathrugnan, CA patent application No.: 2,737,356 A1, incorporated herein by reference in its entirety]. As a relatively recent membrane filtration technology, nanofiltration process has been used for improving water flooding efficiency and enhancing oil recovery rate [Seawater sulfate removal with nanofiltration, K. D'Costa, Filtration and Separation, 52(2), March/April 2015, 22-24, incorporated herein by reference in its entirety].

In view of the forgoing, one objective of the present disclosure is to provide a multi-layer membrane containing a mixed polyamide layer disposed on a porous polysulfone substrate. The mixed polyamide layer includes a polycondensation reaction product of a polyfunctional acyl halide and a diamine mixture of 4,7,10-trioxa-1,13-tridecanediamine and a cyclic diamine. A further objective of the present disclosure is to provide a method of fabricating the multi-layer membrane and a device having the multi-layer membrane for water desalination and purification applications.

BRIEF SUMMARY OF THE INVENTION

According to a first aspect, the present disclosure relates to a multi-layer membrane, comprising, consisting essentially of, or consisting of a porous support layer containing a polysulfone, and a selective layer containing reacted units of a polyfunctional acyl halide having at least two acyl halide groups and a diamine mixture including 4,7,10-trioxa-1,13-tridecanediamine and a cyclic diamine of formula (I)

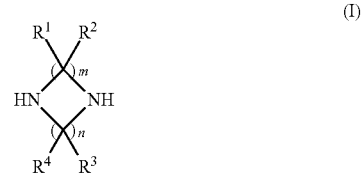

or a solvate thereof, a stereoisomer thereof, or a mixture thereof, wherein (i) $R^1$, $R^2$, $R^3$, and $R^4$ are independently selected from the group consisting of a hydrogen, an optionally substituted alkyl, an optionally substituted cycloalkyl, an optionally substituted arylalkyl, and an optionally substituted aryl, (ii) m and n are independently selected from 2 and 3, (iii) a weight ratio of 4,7,10-trioxa-1,13-tridecanediamine to the cyclic diamine is in a range of 1:100 to 100:1, and (iv) the selective layer is disposed on at least a portion of a surface of the porous support layer.

In one embodiment, the polysulfone is a polysulfone (PSU), and/or a polyethersulfone (PES).

In one embodiment, the porous support layer further contains polyvinylpyrrolidone.

In a further embodiment, a weight ratio of the polysulfone to polyvinylpyrrolidone is in a range of 10:1 to 50:1.

In one embodiment, the polyfunctional acyl halide is a polyfunctional acyl chloride.

In one embodiment, the polyfunctional acyl halide is at least one selected from the group consisting of trimesoyl chloride, 1,2,4-benzenetricarbonyl trichloride, 1,2,4,5-benzenetetracarbonyl tetrachloride, isophthaloyl chloride, terephthaloyl chloride, and [1,1'-biphenyl]-4,4'-dicarbonyl dichloride.

In one embodiment, the polyfunctional acyl halide is trimesoyl chloride.

In one embodiment, m and n are 2.

In one embodiment, the cyclic diamine is piperazine.

In a further embodiment, a weight ratio of 4,7,10-trioxa-1,13-tridecanediamine to piperazine is in a range of 1:5 to 2:1.

In a further embodiment, the selective layer has pores with an average diameter in a range of 1-500 nm.

In a further embodiment, the multi-layer membrane has a water flux of 53-300 $Lm^{-2}h^{-1}$, determined by exposing the multi-layer membrane to water at a temperature of 4-60° C., and a transmembrane pressure of 5-60 bar.

In a further embodiment, the multi-layer membrane has a chloride salt rejection of 30-75%, determined by exposing the multi-layer membrane to water containing 500-5,000 ppm chloride salt at a temperature of 4-60° C., and a transmembrane pressure of 5-60 bar.

In a further embodiment, the multi-layer membrane has a sulfate salt rejection of 70-99.5%, determined by exposing the multi-layer membrane to water containing 500-5,000 ppm sulfate salt at a temperature of 4-60° C., and a transmembrane pressure of 5-60 bar.

In one embodiment, the porous support layer has a thickness of 20-1,000 μm.

According to a second aspect, the present disclosure relates to a method of producing the multi-layer membrane of the first aspect wherein the porous support layer further contains polyvinylpyrrolidone. The method involves the steps of (i) mixing the polysulfone, polyvinylpyrrolidone, and a polar aprotic solvent to obtain a polymer mixture, (ii) casting the polymer mixture to form a support layer blend, (iii) gelling the support layer blend to form the porous support layer, and (iv) reacting, on at least a portion of a surface of the porous support layer, a composition containing the polyfunctional acyl halide and the diamine mixture including 4,7,10-trioxa-1,13-tridecanediamine and the cyclic diamine, thereby forming the multi-layer membrane, wherein a weight ratio of 4,7,10-trioxa-1,13-tridecanediamine to the cyclic diamine is in a range of 1:100 to 100:1.

In one embodiment, the polar aprotic solvent is N-methyl-2-pyrrolidone.

In one embodiment, the gelling is performed in water for 12-48 hours.

In one embodiment, the polysulfone is present in an amount of 7-30 wt %, and polyvinylpyrrolidone is present in an amount of 0.2-1 wt %, each relative to a total weight of the polymer mixture.

According to a third aspect, the present disclosure relates to a water desalination system containing one or more of the multi-layer membranes of the first aspect.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
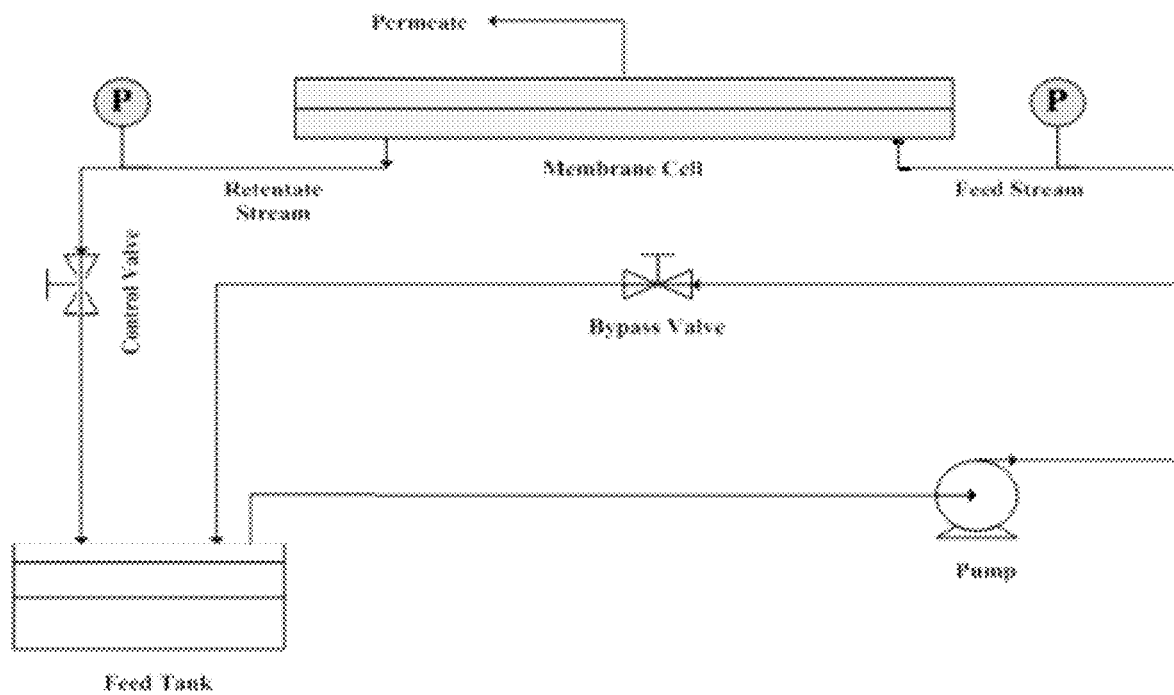
FIG. 1 illustrates an experimental setup for membrane testing.

Embodiments of the present disclosure will now be described more fully hereinafter with reference to the accompanying drawings, in which some, but not all embodiments of the disclosure are shown.

As used herein, the words "a" and "an" and the like carry the meaning of "one or more". Within the description of this disclosure, where a numerical limit or range is stated, the endpoints are included unless stated otherwise. Also, all values and subranges within a numerical limit or range are specifically included as if explicitly written out.

As used herein, the words "about" or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), or +/−15% of the stated value (or range of values).

The membrane or methods disclosed herein can "comprise", "consist essentially of", or "consist of" particular components, compositions, method steps disclosed throughout the specification. A membrane consisting essentially of the components as defined herein would not exclude other materials that do not materially affect the basic and novel characteristic(s) of the membrane. For example, other components may be included in the membrane so long as the other components do not substantially change the surface morphology, water flux, and/or salt rejection of the membrane.

As used herein, the term "solvate" refers to a physical association of a compound of this disclosure with one or more solvent molecules, whether organic or inorganic. This physical association includes hydrogen bonding. In certain instances, the solvate will be capable of isolation, for example when one or more solvent molecules are incorporated in the crystal lattice of the crystalline solid. The solvent molecules in the solvate may be present in a regular arrangement and/or a non-ordered arrangement. The solvate may comprise either a stoichiometric or nonstoichiometric amount of the solvent molecules. Solvate encompasses both solution phase and isolable solvates. Exemplary solvents include, but are not limited to, water, methanol, ethanol, n-propanol, isopropanol, n-butanol, isobutanol, tert-butanol, ethyl acetate and other lower alkanols, glycerine, acetone, dichloromethane (DCM), dimethyl sulfoxide (DMSO), dimethyl acetate (DMA), dimethylformamide (DMF), isopropyl ether, acetonitrile, toluene, N-methylpyrrolidone (NMP), tetrahydrofuran (THF), tetrahydropyran, other cyclic mono-, di- and tri-ethers, polyalkylene glycols (e.g. polyethylene glycol, polypropylene glycol, propylene glycol), and mixtures thereof in suitable proportions. Exemplary solvates include, but are not limited to, hydrates, ethanolates, methanolates, isopropanolates and mixtures thereof. Methods of solvation are generally known to those of ordinary skill in the art.

As used herein, the term "stereoisomer" refers to isomeric molecules that have the same molecular formula and sequence of bonded atoms (i.e. constitution), but differ in the three-dimensional orientations of their atoms in space. This contrasts with structural isomers, which share the same molecular formula, but the bond connection of their order differs. By definition, molecules that are stereoisomers of each other represent the same structural isomer. Enantiomers are two stereoisomers that are related to each other by reflection, they are non-superimposable mirror images. Every stereogenic center in one has the opposite configuration in the other. Two compounds that are enantiomers of each other have the same physical properties, except for the direction in which they rotate polarized light and how they interact with different optical isomers of other compounds. Diastereomers are stereoisomers not related through a reflection operation, they are not mirror images of each other. These include meso compounds, cis- and trans- (E- and Z-) isomers, and non-enantiomeric optical isomers. Diastereomers seldom have the same physical properties. In terms of the present disclosure, stereoisomers may refer to enantiomers, diastereomers, or both.

Conformers, rotamers, or conformational isomerism refers to a form of isomerism that describes the phenomenon of molecules with the same structural formula but with different shapes due to rotations around one or more bonds. Different conformations can have different energies, can usually interconvert, and are very rarely isolatable. There are some molecules that can be isolated in several conformations. Atropisomers are stereoisomers resulting from hindered rotation about single bonds where the steric strain barrier to rotation is high enough to allow for the isolation of the conformers. In terms of the present disclosure, stereoisomers may refer to conformers, atropisomers, or both.

In terms of the present disclosure, stereoisomers of the ring systems, stereogenic centers, and the like can all be present in the compounds, and all such stable isomers are contemplated in the present disclosure. S- and R- (or L- and D-) stereoisomers of the compounds of the present disclosure are described and may be isolated as a mixture of isomers or as separated isomeric forms. All processes or methods used to prepare compounds of the present disclosure and intermediates made therein are considered to be part of the present disclosure. When stereoisomeric products are prepared, they may be separated by conventional methods, for example, by chromatography, fractional crystallization, or use of a chiral agent.

As used herein, the term "alkyl" unless otherwise specified refers to both branched and straight chain saturated aliphatic primary, secondary, and/or tertiary hydrocarbons of typically $C_1$ to $C_{21}$, for example $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, and specifically includes, but is not limited to, methyl, trifluoromethyl, ethyl, propyl, isopropyl, cyclopropyl, butyl, isobutyl, t-butyl, pentyl, cyclopentyl, isopentyl, neopentyl, hexyl, isohexyl, cyclohexyl, cyclohexylmethyl, 3-methylpentyl, 2,2-dimethylbutyl, 2,3-dimethylbutyl, 2-ethylhexyl, heptyl, octyl, nonyl, 3,7-dimethyloctyl, decyl, undecyl, dodecyl, tridecyl, 2-propylheptyl, tetradecyl, pentadecyl, hexadecyl, heptadecyl, octadecyl, nonadecyl, and eicosyl.

The term "cycloalkyl" refers to cyclized alkyl groups. Exemplary cycloalkyl groups include, but are not limited to, cyclopropyl, cyclobutyl, cyclopentyl, cyclohexyl, norbornyl, and adamantyl. Branched cycloalkyl groups such as exemplary 1-methylcyclopropyl and 2-methylcyclopropyl groups are included in the definition of cycloalkyl as used in the present disclosure.

The term "aryl", as used herein, and unless otherwise specified, refers to a substituent that is derived from an aromatic hydrocarbon (arene) that has had a hydrogen atom removed from a ring carbon atom. Aryl includes phenyl, biphenyl, naphthyl, anthracenyl, and the like.

The term "arylalkyl", as used herein, refers to a straight or branched chain alkyl moiety having 1 to 8 carbon atoms that is substituted by an aryl group as defined herein, and includes, but is not limited to, benzyl, phenethyl, 2-methylbenzyl, 3-methylbenzyl, 4-methylbenzyl, 2,4-dimethylbenzyl, 2-(4-ethylphenyl)ethyl, 3-(3-propylphenyl)propyl, and the like.

The term "halide", as used herein, means fluoride, chloride, bromide, and iodide.

As used herein, the term "substituted" refers to at least one hydrogen atom that is replaced with a non-hydrogen group, provided that normal valencies are maintained and that the substitution results in a stable compound. When a substituent is noted as "optionally substituted", the substituents are selected from halo, hydroxyl, alkoxy, oxo, alkanoyl, aryloxy, alkanoyloxy, amino, alkylamino, arylamino, arylalkylamino, disubstituted amines (e.g. in which the two amino substituents are selected from the exemplary group including, but not limited to, alkyl, aryl or arylalkyl), alkanoylamino, aroylamino, aralkanoylamino, substituted alkanoylamino, substituted arylamino, substituted aralkanoylamino, thiol, alkylthio, arylthio, arylalkylthio, alkylthiono, arylthiono, aryalkylthiono, alkylsulfonyl, arylsulfonyl, arylalkylsulfonyl, sulfonamide (e.g. —$SO_2NH_2$), substituted sulfonamide, nitro, cyano, carboxy, unsubstituted amide (i.e. —$CONH_2$), substituted amide (e.g.-CONHalkyl, -CONHaryl,-CONHarylalkyl or cases where there are two substituents on one nitrogen from alkyl, aryl, or alkylalkyl), alkoxycarbonyl, aryl, substituted aryl, guanidine, heterocyclyl (e.g. indolyl, imidazoyl, furyl, thienyl, thiazolyl, pyrrolidyl, pyridyl, pyrimidiyl, pyrrolidinyl, piperidinyl, morpholinyl, piperazinyl, homopiperazinyl and the like), substituted heterocyclyl and mixtures thereof. The substituents may themselves be optionally substituted, and may be either unprotected, or protected as necessary, as known to those of ordinary skill in the art, for example, as taught in Greene, et al., "Protective Groups in Organic Synthesis", John Wiley and Sons, Second Edition, 1991, hereby incorporated by reference in its entirety.

The present disclosure is intended to include all isotopes of atoms occurring in the present compounds. Isotopes include those atoms having the same atomic number but different mass numbers. By way of general example, and without limitation, isotopes of hydrogen include deuterium and tritium, isotopes of carbon include $^{13}C$ and $^{14}C$, isotopes of nitrogen include $^{14}N$ and $^{15}N$, isotopes of oxygen include $^{16}O$, $^{17}O$ and 180, and isotopes of sulfur include $^{32}S$ $^{33}S$, $^{34}S$, and $^{36}S$. Isotopically labeled compounds of the disclosure can generally be prepared by conventional techniques known to those of ordinary skill in the art or by processes and methods analogous to those described herein, using an appropriate isotopically labeled reagent in place of the non-labeled reagent otherwise employed.

The present disclosure relates to a multi-layer membrane, comprising, consisting essentially of, or consisting of a porous support layer containing a polysulfone, and a selective layer containing reacted units of a polyfunctional acyl halide having at least two acyl halide groups and a diamine mixture.

The multi-layer membrane may be a thin film membrane, a flat sheet membrane, a tubular membrane, or a spiral membrane. The multi-layer membrane may be in the form of various shapes, for example, flat (e.g., for a disc-shaped membrane), bent, curved (e.g., a cylinder shaped membrane), and rippled. In one embodiment, a surface of the multi-layer membrane is curved. In a preferred embodiment, the surface of the multi-layer membrane is flat. As used herein, the term "flat" refers to the general shape of the macrostructure of the multi-layer membrane (i.e. a level surface) and does not refer to a microscopically smooth surface. For example, the multi-layer membrane may have microscopic wrinkles, pores, bumps, ridges, etc. and still have a substantially "flat" macrostructure.

In one embodiment, the multi-layer membrane is a thin film membrane and has a thickness of about 20-2,000 m, about 25-1,500 m, about 50-1,000 m, about 100-800 m, about 200-600 m, about 250-500 m, or about 300-400 km. In some embodiments where the multi-layer membrane is disc-shaped, a diameter of the membrane may be 10-100 mm, 11-80 mm, or 12-50 mm. In some embodiments, the multi-layer membrane is in a form of a rectangular sheet having a width of 2-110 cm, 10-70 cm, or 20-60 cm. A length of the rectangular sheet may range from 10 cm to 122 m, 100 cm to 50 m, 1 m to 20 m, or 5 m to 10 m.

Unlike a spongy membrane, a dense membrane may be essentially free of macrovoids including pores. When compared to dense membranes, a porous, multi-layer membrane having a sponge-like structural feature may be advantageous as it allows for high flux permeation and is capable of performing multi-stage separation processes across a single membrane. In one embodiment, the membrane disclosed herein is a multilayered porous membrane.

The present disclosure further relates to water purification/filtration/desalination devices and systems incorporating one or more of the multi-layer membranes of the first aspect. As used herein, the term "desalination" refers to a process for removal of heavy metals and minerals from an aqueous sample in order to produce potable water that is safe for not only ingestion but also a variety of domestic, medical, and industrial uses. Examples of minerals removed by desalination with the multi-layer membrane of the present disclosure include, but are not limited to, chlorides, fluorides, bromides, sulfates, sulfides, nitrates, bicarbonates, and carbonates of sodium, potassium, calcium, and magnesium. Examples of heavy metals removed with the multi-layer membrane of the present disclosure include, but are not limited to, cadmium, arsenic, mercury, lead, chromium, zinc, and copper. Examples of an aqueous sample that may be treated with the method include, but are not limited to, drinking water, sea water, brackish water, saline water, wastewater, industrial effluent water, brine and salt water. The amount of salt in brine is more than 50 g/L. The amount of salt in saline water ranges from 30-50 g/L. The amount of salt in sea water ranges from 30-40 g/L. The amount of salt in brackish water is 0.5-30 g/L.

A water desalination/water treatment device, as used herein, refers to a single device that is configured to remove salts including minerals and heavy metals from an aqueous sample (i.e. feed fluid). Similarly, a desalination/water treatment system, as used herein, refers to a multi-device system that is configured to do the same. Components of a desalination/water treatment system of the present disclosure include, but are not limited to, a feed tank, a pump, a flow control valve, one or more of the multi-layer membranes, a column containing the membranes, a permeate collection point, and a retenate collection point.

The membrane testing setup illustrated by FIG. 1 is an example of a desalination device that tests membranes under crossflow filtration conditions that are similar to those employed in practical desalination applications. Crossflow filtration means that a feed fluid (i.e. aqueous solution to be filtered) is passed across the multi-layer membrane (tangentially) at positive pressure relative to a permeate side. The difference in pressure between the feed and permeate sides of a membrane is defined as "transmembrane pressure". A proportion of the material in the feed which is smaller than the membrane pore size passes through the membrane as a purified fluid, which may also be termed as permeate or filtrate; everything else that does not pass through the membrane is retained on the feed side of membrane as retentate, and may be also called reject fluid or concentrate. Crossflow filtration can be a continuous process, unlike batch-wise dead-end filtration. During a desalination process, the feed fluid may be contacted with the multi-layer membrane(s) for at least 15 minutes, preferably 0.5-8 hours, more preferably 0.75-4 hours, even more preferably 1-2 hours.

The selective layer of the multi-layer membrane contains reacted units of a polyfunctional acyl halide having at least two acyl halide groups and a diamine mixture including 4,7,10-trioxa-1,13-tridecanediamine (TTDA)

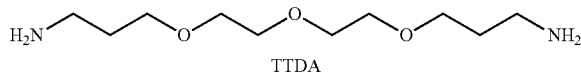

TTDA and a cyclic diamine of formula (I)

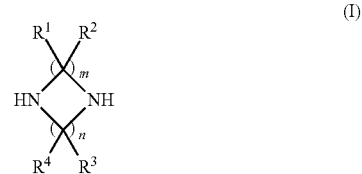

or a solvate thereof, a stereoisomer thereof, or a mixture thereof.

It is equally envisaged that other linear diamines with various degrees of ethoxylation (—$OC_2H_4$-) including, but not limited to, 4,9-dioxa-1,12-dodecanediamine, 1,11-diamino-3,6,9-trioxaundecane, and 2,2'-(ethylenedioxy)bis (ethylamine) may be used herein in addition to TTDA.

$R^1$, $R^2$, $R^3$, and $R^4$ are independently selected from the group consisting of a hydrogen, an optionally substituted alkyl, an optionally substituted cycloalkyl, an optionally substituted arylalkyl, and an optionally substituted aryl. Preferably, $R^1$, $R^2$, $R^3$, and $R^4$ are a hydrogen.

m and n are independently selected from 2 and 3. In one or more embodiments, m=n. In some embodiments, m and n are 3. For example, the cyclic diamine of formula (I) is 1,5-diazocane

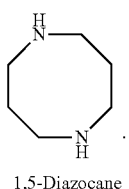

1,5-Diazocane

In some embodiments, m and n are 2. In a preferred embodiment, the cyclic diamine of formula (I) is piperazine

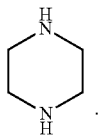

Piperazine

In alternative embodiments, m n. For example, the cyclic diamine of formula (I) is homopiperazine

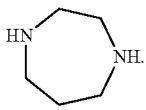

Homopiperazine

It is equally envisaged that other diamines with a cyclic functionalities including, but not limited to, 2-methyl piperazine, 2-(trifluoromethyl)piperazine, 1-(2-aminoethyl)piperazine, 2-(2-methoxyphenyl)piperazine, 2-(2-fluoro-phenyl)-piperazine, 1,4-diaminocyclohexane, 1,3-diaminocyclohexane, and bis-(4-amino-cyclohexyl)methane may be used in addition to or in lieu of the aforementioned cyclic diamine.

The polyfunctional acyl halide of the present disclosure contains at least 2, preferably at least 3, preferably at least 4 acyl halide groups. In one embodiment, the polyfunctional acyl halide is a polyfunctional acyl chloride, a polyfunctional acyl bromide, or both. Preferably, the polyfunctional acyl halide is a polyfunctional acyl chloride. In one or more embodiments, the polyfunctional acyl halide is at least one selected from the group consisting of trimesoyl chloride (1,3,5-benzenetricarbonyl trichloride), 1,2,4-benzenetricarbonyl trichloride, 1,2,4,5-benzenetetracarbonyl tetrachloride, isophthaloyl chloride, terephthaloyl chloride, and [1,1'-biphenyl]-4,4'-dicarbonyl dichloride. In a most preferred embodiment, the polyfunctional acyl halide is trimesoyl chloride.

As used herein, monomers are molecules which can undergo polymerization, thereby contributing constitutional repeating units to the structures of a macromolecule or polymer. The process by which monomers combine end to end to form a polymer is referred to herein as "polymerization". As used herein, a "copolymer" refers to a polymer derived from more than one species of monomer and are obtained by "copolymerization" of more than one species of monomer. Copolymers obtained by copolymerization of two monomer and/or oligomer species may be termed bipolymers, those obtained from three monomers may be termed terpolymers and those obtained from four monomers may be termed quarterpolymers, etc.

As used herein, "crosslinking", "cross-linking", "crosslinked", "cross-linked", a "crosslink", or a "cross-link" refers to polymers and resins containing branches that connect polymer chains via bonds that link one polymer chain to another. The crosslink may be an atom, a group of atoms, or a number of branch points connected by bonds, groups of atoms, or polymer chains. A crosslink may be formed by chemical reactions that are initiated by heat, pressure, radiation, change in pH, etc. with the presence of at least one crosslinking monomer having more than two extension points, which is a monomer having more than two reactive sites. In certain embodiments, the polyfunctional acyl halide having at least 3 reactive sites (e.g. trimesoyl chloride) functions as a crosslinking monomer, where each reactive position can act as an extension point and form a crosslink upon reacting with the diamine mixture.

A "polycondensation" refers to a form of step growth polymerization where monomers join together by losing small molecules such as hydrogen halide (e.g. hydrogen chloride), water, and methanol, as byproducts. This is in contrast to addition polymerizations which often involve reactions of unsaturated molecules. In one embodiment, the polyfunctional acyl halide is trimesoyl chloride, and the selective layer is a crosslinked polyamide resulting from a polycondensation reaction of the polyfunctional acyl halide and the diamine mixture containing TTDA and the cyclic diamine.

In some embodiments, a weight ratio of TTDA to the cyclic diamine is in a range of 1:100 to 100:1, 1:95 to 95:1, 1:90 to 90:1, 1:80 to 80:1, 1:70 to 70:1, 1:60 to 60:1, 1:50 to 50:1, 1:40 to 40:1, 1:30 to 30:1, 1:25 to 25:1, 1:20 to 20:1, 1:15 to 15:1, 1:10 to 10:1, 1:9 to 9:1, 1:8 to 8:1, 1:7 to 7:1, 1:6 to 6:1, 1:5 to 5:1, 1:4 to 4:1, 1:3 to 3:1, 1:2 to 2:1, or about 1:1. In a preferred embodiment, the weight ratio of TTDA to the cyclic diamine (e.g. piperazine) is in a range of 1:5 to 2:1, preferably 1:4 to 3:2, more preferably 1:3 to 1:1, or about 1:2.

The molar ratio of the polyfunctional acyl halide to a total amount of the diamines (TTDA and the cyclic diamine) is dependent on the number of reactive sites on the polyfunctional acid halide. In one embodiment, the molar ratio of the polyfunctional acyl halide to a total amount of the diamines is about 2:(the number of reactive sites on the polyfunctional acyl halide). For example, when the polyfunctional acyl halide is trimesoyl chloride, the molar ratio of the polyfunctional acyl halide to a total amount of the diamines is about 2:3.

In one embodiment, a thickness of the selective layer is up to 1 μm, preferably 0.01-0.5 μm, preferably 0.1-0.2 μm. However, in certain embodiments, the thickness of the selective layer may be less than 0.01 μm or greater than 1 μm.

Figure 2A:
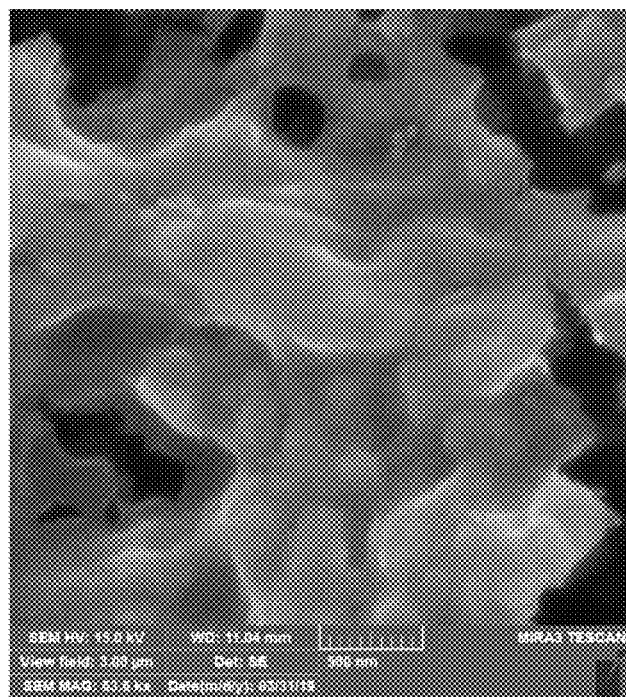
FIG. 2A is a scanning electron microscopy (SEM) image (scale bar: 500 nm) of a surface morphology of membrane #1 with 100 wt % piperazine present in the selective layer (see Table 2 for composition details).
Figure 2B:
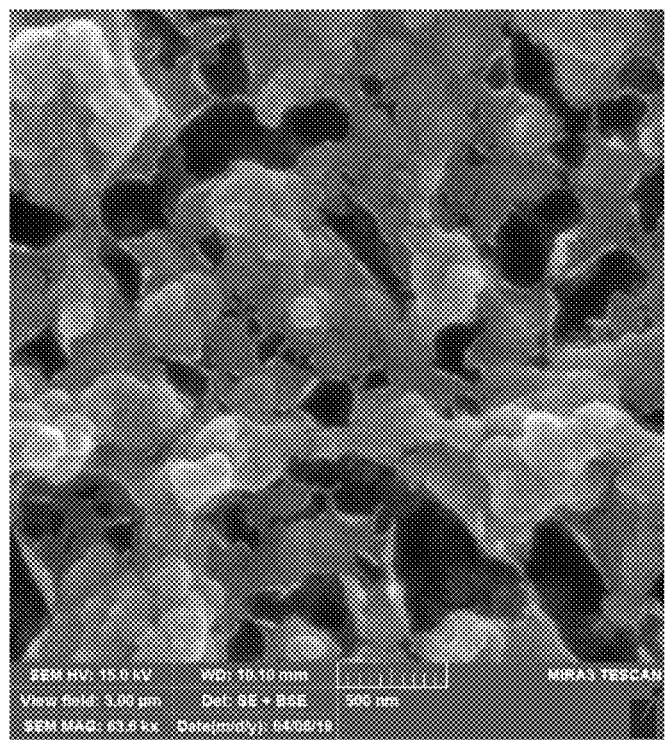
FIG. 2B is a SEM image (scale bar: 500 nm) of a surface morphology of membrane #2 with 75 wt % piperazine (PIP) and 25 wt % of 4,7,10-trioxa-1,13-tridecanediamine (TTDA) present in the selective layer (see Table 2 for composition details).
Figure 2C:
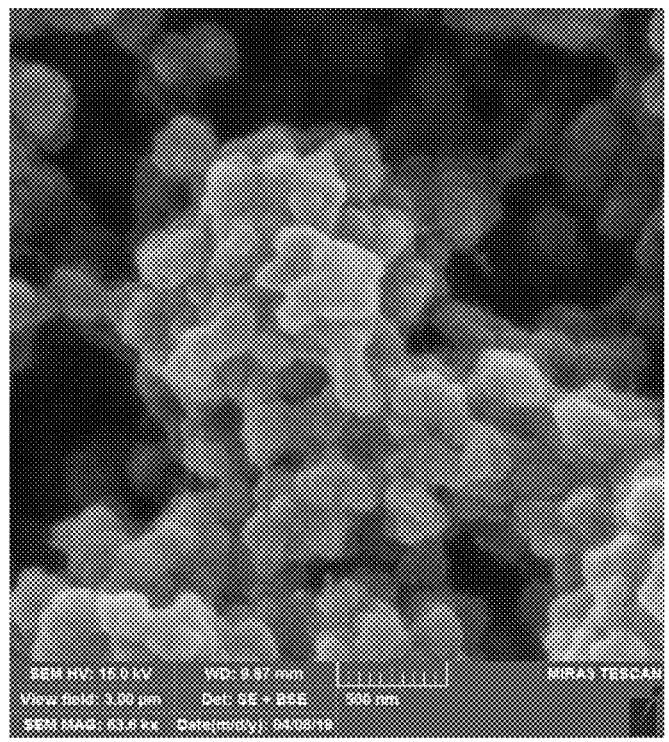
FIG. 2C is a SEM image (scale bar: 500 nm) of a surface morphology of membrane #3 with 50 wt % PIP and 50 wt % TTDA present in the selective layer (see Table 2 for composition details).
Figure 2D:
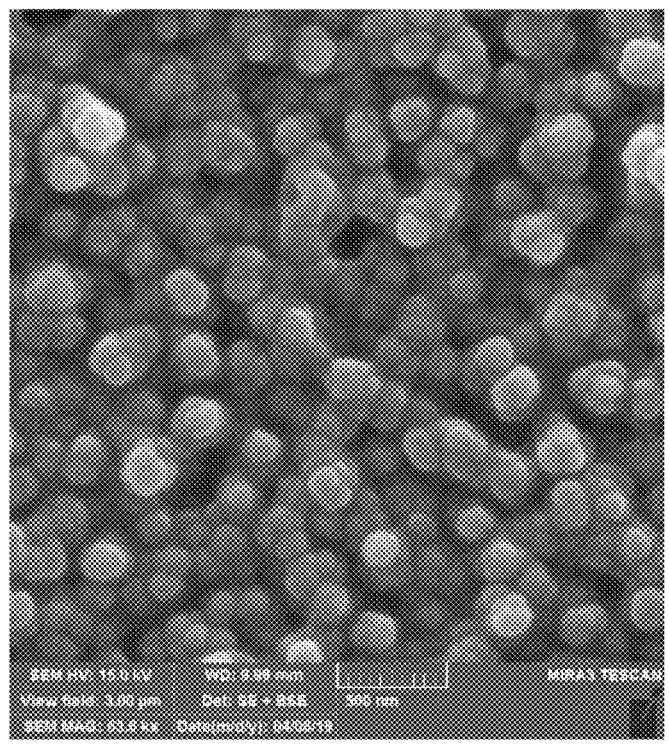
FIG. 2D is a SEM image (scale bar: 500 nm) of a surface morphology of membrane #4 with 25 wt % PIP and 75 wt % TTDA present in the selective layer (see Table 2 for composition details).
Figure 2E:
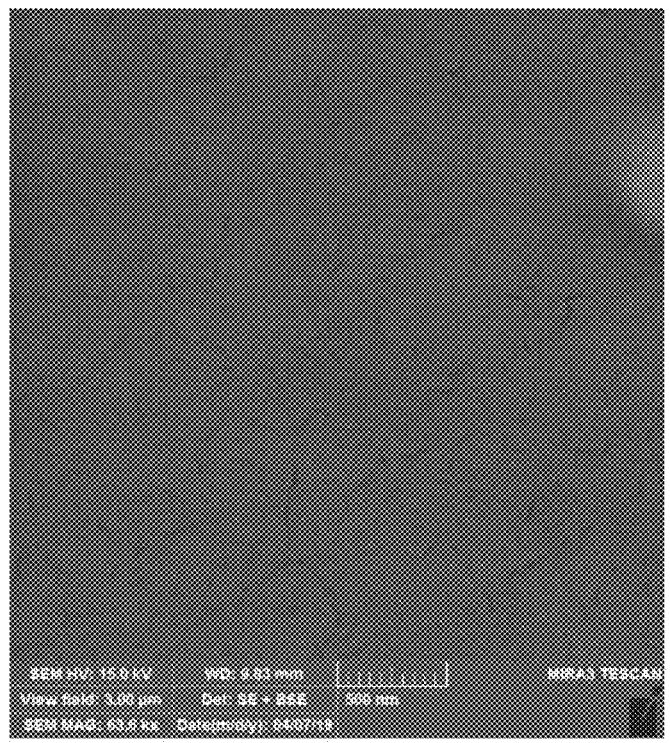
FIG. 2E is a SEM image (scale bar: 500 nm) of a surface morphology of membrane #5 with 100 wt % TTDA present in the selective layer (see Table 2 for composition details).

The selective layer disclosed herein may have a porous morphology. In one or more embodiments, when both TTDA and the cyclic diamine are present in the diamine mixture, a cross-section of the selective layer resembles a sponge (see for example FIGS. 2B-D). In a preferred embodiment, the selective layer has unconnected pores each representing an isolated cavity having an unbroken pore wall. At least 50% of a total number of pores present in the selective layer are unconnected, preferably at least 60%, preferably at least 70%, preferably at least 80%, preferably at least 90%, preferably at least 95% of the total number of pores present in the selective layer are unconnected. Alternatively, the selective layer may contain pores which are part of a network of pores (i.e., a plurality of interconnected pores). In another embodiment, pores in the selective layer are randomly oriented and may intersect.

The cross-section of pores of the selective layer may have a regular shape, for example, a shape of a circle, an oval, or a polygon (e.g., triangle, rectangle, hexagon, rhombus, trapezium, parallelogram, pentagon, heptagon, octagon, nonagon, decagon, undecagon, and dodecagon). The polygon may be regular (i.e., all sides equal in length and all equal internal angles), convex (i.e., no internal angle is more than 180°), or concave. In some embodiments, the cross-section of the pores may have an irregular shape in which each side has a different length and/or each side has a different curvature. For example, for pores with an irregular shaped cross-section having a first side, a second side, and a third side, the first and the second sides is a straight line, and the third is a curve. Further, the length of the first side may be 1-50%, 5-40%, or 10-30% longer than a length of the second side.

The selective layer may be macroporous, mesoporous, or microporous. The term "microporous" means the pores of the selective layer have an average diameter of less than 2 nm. The term "mesoporous" means the pores of the selective layer have an average diameter of 2-50 nm. The term "macroporous" means the pores of the selective layer have an average diameter larger than 50 nm. In one embodiment, the selective layer is macroporous, and has pores with an average diameter in a range of 0.051-0.5 m, 0.08-0.45 m, 0.1-0.4 m, 0.15-0.35 m, or 0.2-0.3 μm. In another embodiment, the selective layer has pores with an average diameter in a range of 1-50 nm, 2-40 nm, 3-30 nm, or 4-25 nm.

In one or more embodiments, the pores are present in the selective layer at a density of $10^3$-$10^7$/mm$^2$, $10^4$-$10^6$/mm$^2$, or about $10^5$/mm$^2$. Depending on the size of the selective layer, it may have at least $10^2$ pores, at least $10^3$ pores, at least $10^4$ pores, at least $10^1$ pores, at least $10^6$ pores, or at least $10^7$ pores. Preferably, the selective layer has pores uniformly arranged, i.e. a distance between a pore and all its neighbors is the same or substantially the same. The distance can be said to be substantially the same when the shortest distance is at least 80%, at least 85%, at least 90%, or at least 95% of the average distance and the longest distance is not more than 120%, not more than 110%, or not more than 105% of the average distance. The distance is measured from a center of a pore to a center of a neighboring pore and may be in a range of 1 nm to 1 μm, 10-800 nm, 50-600 nm, 100-400 nm, or 200-300 nm. Alternatively, the pores are randomly arranged in the selective layer, i.e. distances between a pore and its neighboring pores are different. Energy-dispersive X-ray spectroscopy, X-ray microanalysis, elemental mapping, transmission electron microscopy, scanning electron microscopy, and scanning transmission electron microscopy may be useful techniques for observing the arrangement of the pore in the selective layer.

The multi-layer membrane of the present disclosure further contains a porous support layer containing a polysulfone, wherein the aforementioned selective layer is disposed on at least a portion of a surface of the porous support layer. In addition to the selective layer and the porous support layer, any number of other layers may be present, such as a backing web layer onto which the porous support layer is cast. In one embodiment, the backing web layer comprises a non-woven fabric, a woven fabric, or both. Preferably, the backing web layer is a non-woven fabric. In at least one embodiment, the backing web layer is a non-woven fabric Viledon® novatexx 2484, available from Freudenberg Filtration Technologies, Germany.

As used herein, "disposed" generally indicates the situation where the selective layer directly contacts one or both surfaces of the porous support layer as a surface layer without sagging into the pores of the porous support layer. In certain embodiments, the porous support layer may be partially filled with the selective layer. The selective layer may interact with the surface and/or the pores of the porous support layer via van der Waals forces, hydrogen bonding interactions, and/or π-π interactions (for polymers containing an aryl group such as phenyl and naphthyl).

In one embodiment, a thickness of the porous support layer is 20-1,000 μm, preferably 50-800 μm, more preferably 100-600 μm, even more preferably 200-400 μm, or about 300 μm. In terms of pore size, the porous support layer can have pores with an average diameter in a range of 10 nm to 10 μm, 50 nm to 5 μm, 100 nm to 1 μm, or 200-500 nm in diameter. The pore sizes of the porous support layer should be sufficiently large so that a permeate can pass through without reducing the permeability of the multi-layer membrane. However, the pores of the porous support layer should not be large enough so as to interfere with the bridging over of the selective layer formed thereon.

In a preferred embodiment, the multi-layer membrane disclosed herein is an asymmetric membrane, and the porous support layer is coated by the selective layer on the side that will be exposed to a feed fluid when the membrane is in use. The selective layer preferably covers greater than 25%, greater than 40%, greater than 50%, greater than 60%, greater than 70%, greater than 80%, greater than 90%, greater than 95%, greater than 97%, greater than 99%, greater than 99.5% of the surface of the porous support layer which is on the feed side when the multi-layer membrane is in use. As defined herein, the surface area of the porous support layer primarily consists of the outer surface(s) of the porous support but excludes the pore surface of the porous support.

Non-limiting examples of polysulfone applicable to the present disclosure include polysulfones (e.g. poly(1,4-phenylene ether-ether-sulfone), poly(1-hexadecene-sulfone), poly(1-tetradecene-sulfone), poly(oxy-1,4phenylenesulfonyl-1,4-phenylene), poly(oxy-1,4-phenylenesulfonyl-1,4-phenylene), poly(oxy-1,4-phenylenesulfonyl-1,4-phenylene), poly(oxy-1,4-phenylenesulfonyl-1,4-phenylene)), polysulfonamides (e.g., poly[1-[4-(3-carboxy-hydroxyphenylazo)benzenesulfonamido]-1,2-ethanediyl]), sulfonated derivatives thereof, and mixtures thereof.

As used herein, a degree of polymerization is defined as the number of monomeric units in a macromolecule or polymer.

In one embodiment, the polysulfone used herein is polysulfone (PSU) of formula (II)

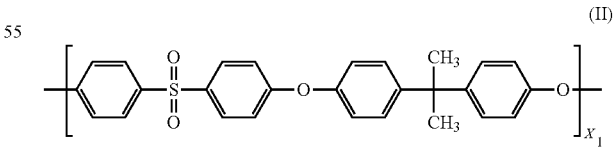

wherein the degree of polymerization $X_1$ is in a range of from 100 to 100,000, 150 to 75,000, 200 to 50,000, 250 to 40,000, 300 to 30,000, 400 to 20,000, 500 to 10,000, 750 to 7,500, or 1,000 to 5,000.

In another embodiment, the polysulfone is polyethersulfone (PES) of formula (III)

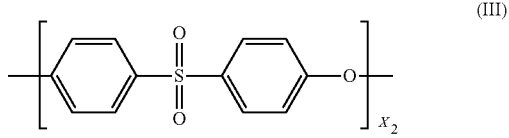

(III)

wherein the degree of polymerization $X_2$ is in a range of from 100 to 100,000, 150 to 75,000, 200 to 50,000, 250 to 40,000, 300 to 30,000, 400 to 20,000, 500 to 10,000, 750 to 7,500, or 1,000 to 5,000.

In another embodiment, the polysulfone is polyphenylsulfone (PPSU) of formula (IV)

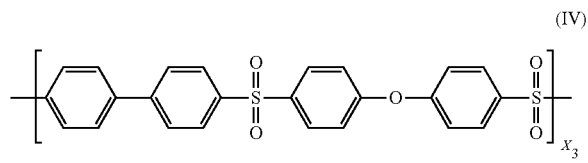

(IV)

wherein the degree of polymerization $X_3$ is in a range of from 100 to 10,000, 150 to 7,500, 200 to 50,000, 250 to 40,000, 300 to 30,000, 400 to 20,000, 500 to 10,000, 750 to 7,500, or 1,000 to 5,000.

Some of the techniques for measuring molecular weight of polymeric products are based on measuring sedimentation, light scattering, osmometry, NMR spectroscopy, ebulliometry, and size exclusion chromatography for determining absolute molecular weight distribution. By the use of these methods, molecular weight parameters such as number average ($M_n$), viscosity average ($M_v$), and weight average ($M_w$) molecular weights can be determined.

In a preferred embodiment, the polysulfone of the present disclosure has a weight average molecular weight ($M_w$) ranging from 10,000 g/mol to 5,000,000 g/mol, preferably 15,000 g/mol to 1,000,000 g/mol, preferably 20,000 g/mol to 500,000 g/mol, preferably 25,000 g/mol to 100,000 g/mol, preferably 30,000 g/mol to 60,000 g/mol, or about 35,000 g/mol. In a related embodiment, the polysulfone of the present disclosure has a number average molecular weight ($M_n$) ranging from 4,000 g/mol to 1,000,000 g/mol, preferably 6,000 g/mol to 500,000 g/mol, preferably 8,000 g/mol to 100,000 g/mol, preferably 10,000 g/mol to 50,000 g/mol, preferably 12,000 g/mol to 25,000 g/mol, or about 16,000 g/mol.

As used herein, the polydispersity index (PDI or heterogeneity index) is a measure of the distribution of molecular mass in a given polymer sample. The PDI is calculated as the weight average molecular weight divided by the number average molecular weight. Typically, dispersities vary based on the mechanism of polymerization and can be affected by a variety of reaction conditions such as reactant ratios, how close the polymerization went to completion, etc. The polysulfone may have a polydispersity index (PDI, a measure of the width of molecular weight distribution) in a range of 1 to 10, 1.5 to 8, 1.7 to 6, or 1.9 to 4.

Other hydrophobic polymers that can be used in addition to or in lieu of the polysulfone include, but are not limited to, polyamide (PA), polyaramide (PAA), polycarbonate (PC), polyether, polyurethane (PU), polyetherimide, copolymers thereof, and mixtures thereof.

Water-soluble polymer(s) including, but not limited to, polyvinylpyrrolidone, polyethylene glycol, polypropylene glycol, polyacrylic acids, and methyl cellulose may be incorporated into the porous support layer to impart hydrophilicity to the membrane. The addition of water-soluble polymer(s) to hydrophobic polymer(s) (e.g. polysulfone) may induce pore formation of the porous support layer via a phase inversion process by the methods discussed hereinafter. In a most preferred embodiment, the porous support layer further contains polyvinylpyrrolidone.

As used herein, polyvinylpyrrolidone (PVP), also commonly known as polyvidone or povidone, refers to a hydrophilic polymer obtainable from the monomer N-vinylpyrrolidone. PVP binds to polar molecules exceptionally well, owing to its polarity. PVP is soluble in water and other polar solvents including alcohols (e.g. methanol and ethanol) as well as more exotic solvents (e.g. deep eutectic solvent and urea). In solution, PVP has excellent wetting properties and readily forms films.

PVP polymers are available in several viscosity grades, ranging from low to high molecular weight and may be supplied in various viscosity grades as a powder and/or aqueous solution. Exemplary suitable commercial grades of polyvinylpyrrolidone include, but are not limited to, PVP K-12, PVP K-15, PVP K-30, PVP K-60, PVP K-90, and PVP K-120. The K-value assigned to various grades of PVP polymer may represent a function of the average molecular weight, the degree of polymerization, and the intrinsic viscosity. The K-values may be derived from viscosity measurements and calculated according to Fikentscher's formula. In a preferred embodiment, the polyvinyl pyrrolidone has a K-value in a range of 8-140, preferably 10-100, preferably 15-80, preferably 20-60, preferably 25-40.

In some embodiments, the polyvinylpyrrolidone used herein has a weight average molecular weight ($M_w$) in a range of 3,000-3,000,000 g/mol, preferably 6,000-2,000,000 g/mol, preferably 10,000-1,000,000 g/mol, preferably 15,000-900,000 g/mol, preferably 20,000-500,000 g/mol, preferably 30,000-300,000 g/mol, preferably 30,000-100,000 g/mol, preferably 40,000-80,000 g/mol. In one embodiment, the polyvinylpyrrolidone used herein has a polydispersity index (PDI) of up to 6, preferably 1.1-5, preferably 1.25-3, preferably 1.5-2.5, preferably 1.8-2. In one embodiment, the polyvinylpyrrolidone used herein has a degree of polymerization of 50-5000, preferably 100-2500, preferably 100-1500, preferably 100-750, preferably 100-300.

In one or more embodiments, a weight ratio of the polysulfone to polyvinylpyrrolidone present in the porous support layer is in a range of 10:1 to 100:1, preferably 15:1 to 75:1, preferably 20:1 to 50:1, preferably 25:1 to 40:1, or about 30:1. However, depending on the preparation method of the porous support layer, the weight ratio of the polysulfone to polyvinylpyrrolidone can be less than 10:1 or greater than 100:1. For example, gelling (coagulating) in a water bath for a prolonged period of time may lead to a smaller amount of PVP in the porous support layer due to leaching of PVP from the polysulfone matrix.

The multi-layer membrane disclosed herein in any of its embodiments may be a reverse osmosis membrane, a microfiltration membrane, an ultrafiltration membrane, or a nanofiltration membrane. Nanofiltration membranes generally have pore sizes smaller than those of microfiltration and ultrafiltration membranes, but larger than those of reverse osmosis membranes. Nanofiltration membranes exhibit a low rejection rate of monovalent salts while a high rejection rate of divalent/polyvalent salts and natural and synthetic organic materials.

Nanofiltration membranes have been used to soften hard water, i.e., to remove calcium and magnesium salts from water. In one embodiment, the multi-layer membrane is a nanofiltration membrane.

The performance of the multi-layer membrane depends on a transmembrane pressure, and an increase in transmembrane pressure usually boosts the water flux (see Table 3 of Example 4). In one embodiment, a suitable transmembrane pressure for the multi-layer membrane ranges from 2-60 bar, preferably 5-50 bar, preferably 10-40 bar, preferably 20-30 bar. The performance of the multi-layer membrane is also temperature dependent and the membrane usually exhibits better water flux at higher temperatures (see Table 4 of Example 4). In one embodiment, a suitable operation temperature for the multi-layer membrane ranges from 4-80° C., preferably 10-60° C., preferably 15-50° C., preferably 20-40° C., preferably 25-30° C.

Hydrophilicity and porosity are two main factors determining water flux or transport through a membrane. In general, the more hydrophilic a membrane is, the higher the water flux is. Similarly, in general, high porosity leads to high water flux of the membrane. The multi-layer membrane of the present disclosure exhibits a water flux of 50-300 $Lm^{-2}h^{-1}$ (liter of permeate or purified fluid produced in 1 hour per 1 $m^2$ of the membrane), preferably 53-250 $Lm^{-2}h^{-1}$, preferably 70-200 $Lm^{-2}h^{-1}$, preferably 90-170 $Lm^{-2}h^{-1}$, preferably 120-150 $Lm^{-2}h^{-1}$, at a temperature of 4-80° C., 10-60° C., 15-50° C., 20-40° C., or 25-30° C., and a transmembrane pressure of 2-60 bar, 5-50 bar, 10-40 bar, or 20-30 bar.

As used herein, the term "salt rejection" refers to a ratio (in percentile) of an amount of salt(s) separated/removed by a membrane relative to an amount of the salt(s) that are initially present in an aqueous solution before contacting the membrane. The multi-layer membrane has a chloride salt rejection of 30-75%, preferably 35-70%, preferably 40-65%, preferably 45-60%, preferably 50-55%, determined by exposing the multi-layer membrane to an aqueous solution containing 500-5,000 ppm, 600-4,000 ppm, 700-3,000 ppm, 800-2,000 ppm, 900-1,500 ppm, or about 1,000 ppm chloride salt, at a temperature of 4-80° C., 10-60° C., 15-50° C., 20-40° C., or 25-30° C., and a transmembrane pressure of 2-60 bar, 5-50 bar, 10-40 bar, or 20-30 bar. In at least one embodiment, the chloride salt is NaCl.

In a further embodiment, the multi-layer membrane has a sulfate salt rejection of 70-99.5%, preferably 75-99%, preferably 80-95%, preferably 85-90%, determined by exposing the multi-layer membrane to an aqueous solution containing 500-5,000 ppm 600-4,000 ppm, 700-3,000 ppm, 800-2,000 ppm, 900-1,500 ppm, or about 1,000 ppm sulfate salt, at a temperature of 4-80° C., 10-60° C., 15-50° C., 20-40° C., or 25-30° C., and a transmembrane pressure of 2-60 bar, 5-50 bar, 10-40 bar, or 20-30 bar. In at least one embodiment, the sulfate salt is $MgSO_4$.

As shown in Table 2 (Example 4), increasing the TTDA content in the diamine mixture generally leads to a decrease in porosity of the selective layer (see FIGS. 2A-E), which boosts the salt rejection of monovalent salts (e.g. NaCl). Also, a satisfactory salt rejection of divalent/polyvalent salts (e.g. $MgSO_4$) is observed when the cyclic diamine (e.g. piperazine) and TTDA are present in the diamine mixture at a weight ratio of 1:2 to 2:1, preferably 2:3 to 3:2, or about 1:1.

According to a further aspect, the present disclosure relates to a method of producing the multi-layer membrane of the first aspect wherein the porous support layer further contains polyvinylpyrrolidone. The method involves the steps of (i) mixing the polysulfone, polyvinylpyrrolidone, and a polar aprotic solvent to obtain a polymer mixture, (ii) casting the polymer mixture to form a support layer blend, (iii) gelling the support layer blend to form the porous support layer, and (iv) reacting, on at least a portion of a surface of the porous support layer, a composition containing the polyfunctional acyl halide and the diamine mixture including 4,7,10-trioxa-1,13-tridecanediamine and the cyclic diamine, thereby forming the multi-layer membrane.

The porous support layer described herein may be commercially available or prepared in-house according to methods known to one of ordinary skill in the art. For example, the porous support layer may be prepared by the following method via a phase inversion process.

The previously specified polysulfone and polyvinylpyrrolidone (PVP) may be mixed with a solvent to form a polymer mixture. The polysulfone and PVP may be dissolved with the solvent at a temperature of 25-70° C., 30-55° C., or about 45° C., via agitation for a duration of 6-48 hours, 12-36 hours, or 18-24 hours. Methods of agitation include, without limitation, swirling by hand, stirring with a magnetic stir plate or a mechanical stirrer, shaking with a rotary shaker, sonicating using an ultrasonic bath or an ultrasonic probe. In one embodiment, the polysulfone and PVP are mixed with the solvent using a magnetic stirrer at a speed of 100-1,000 rpm, 200-750 rpm, or 300-500 rpm. An external heat source, such as a water bath or an oil bath, an oven, microwave, a thermostatted thermocirculator, or a heating mantle, may be employed to heat the polymer mixture.

The solvent used for dissolving the polymers are chosen primarily for their ability to completely dissolve the polymers (e.g. polysulfone, polyvinylpyrrolidone) and their miscibility with water for solvent removal in the membrane formation steps. Other considerations in the selection of solvents include low toxicity, low corrosive activity, low environmental hazard potential, availability, and cost. Preferred solvents include polar aprotic solvents such as N-methyl-2-pyrrolidone (NMP), dimethylformamide (DMF), dimethylsulfoxide (DMSO), and dimethylacetamide (DMA), and mixtures thereof. In a most preferred embodiment, the solvent is N-methyl-2-pyrrolidone.

In one embodiment, the polysulfone is present in an amount of 7-30 wt %, preferably 9-25 wt %, more preferably 11-20 wt %, even more preferably 13-17 wt %, or about 15 wt % relative to a total weight of the polymer mixture. In a related embodiment, PVP is present in an amount of 0.2-1 wt %, preferably 0.3-0.9 wt %, preferably 0.35-0.8 wt %, more preferably 0.4-0.7 wt %, even more preferably 0.45-0.6 wt %, or about 0.5 wt % relative to a total weight of the polymer mixture. In one embodiment, a weight ratio of the polysulfone to PVP ranges from 7:1 to 150:1, preferably from 10:1 to 100:1, preferably from 15:1 to 50:1, preferably from 20:1 to 40:1, or about 30:1.

To fabricate the support layer blend, the polymer mixture may be cast by a continuous single step extrusion film process, flow coating, spin coating, or solvent casting. In one embodiment, the mixture may be cast onto the aforementioned backing web layer (e.g. non-woven fabric) attached to a glass plate or directly onto a glass plate, and a casting knife (e.g. an adjustable doctor blade) may be used for spreading the polymer mixture across the backing web layer or the glass plate to produce a support layer blend with a uniform thickness of 20-1,000 µm, preferably 50-800 µm, more preferably 100-600 µm, even more preferably 200-400 µm, or about 300 µm.

The support layer blend may be gelled (coagulated) via a phase inversion process. In one embodiment, the gelling is performed by immersing the support layer blend in water for 6-48 hours, preferably 12-36 hours, more preferably about 24 hours at a temperature of 4-70° C., 10-50° C., or 20-35° C., thereby forming the porous support layer. The water used herein may be tap water, distilled water, bidistilled water, deionized water, deionized distilled water, reverse osmosis water, and/or some other water. In one embodiment, the water is bidistilled to eliminate trace metals. Preferably the water is distilled, bidistilled, deionized, deionized distilled, or reverse osmosis water. Most preferably the water is distilled water. The porous support layer may be separated from the glass plate and stored in dark until used.

The multi-layer membrane may be formed by reacting a composition containing the polyfunctional acyl halide and the diamine mixture including 4,7,10-trioxa-1,13-tridecanediamine (TTDA) and the cyclic diamine, on at least a portion of a surface of the porous support layer. Preferably, the reacting is performed on the side of the porous support layer that will be exposed to a feed fluid when the membrane is in use. In one embodiment, the selective layer covers greater than 25%, greater than 40%, greater than 50%, greater than 60%, greater than 70%, greater than 80%, greater than 90%, greater than 95%, greater than 97%, greater than 99%, greater than 99.5% of the surface of the porous support layer which is on the feed side when the multi-layer membrane is in use.

The selective layer may be formed on a surface of the porous support layer via an interfacial polymerization process. For example, a surface of the porous support layer may be coated with the diamine mixture to form a diamine coated support layer. In a preferred embodiment, the diamine mixture may be dissolved in a polar solvent, preferably water, to form a polar mixture prior to the coating. The resulting polar mixture may comprise about 0.1-20 wt %, about 0.5-10 wt %, about 1-5 wt % of the diamine mixture relative to a total weight of the polar mixture. Alternatively, the diamine mixture is not dissolved in a separate polar solvent and used directly for the coating.

In a preferred embodiment, a weight ratio of 4,7,10-trioxa-1,13-tridecanediamine (TTDA) to the cyclic diamine (e.g. piperazine) of the diamine mixture is in a range of 1:100 to 100:1, 1:95 to 95:1, 1:90 to 90:1, 1:80 to 80:1, 1:70 to 70:1, 1:60 to 60:1, 1:50 to 50:1, 1:40 to 40:1, 1:30 to 30:1, 1:25 to 25:1, 1:20 to 20:1, 1:15 to 15:1, 1:10 to 10:1, 1:9 to 9:1, 1:8 to 8:1, 1:7 to 7:1, 1:6 to 6:1, 1:5 to 5:1, 1:4 to 4:1, 1:3 to 3:1, 1:2 to 2:1, or about 1:1. In a preferred embodiment, the weight ratio of TTDA to the cyclic diamine (e.g. piperazine) in the diamine mixture is in a range of 1:5 to 2:1, preferably 1:4 to 3:2, more preferably 1:3 to 1:1, or about 1:2.

The polar mixture may be applied to the porous support layer by dipping, immersing, coating or other known techniques. Once coated onto the porous support layer, excess polar mixture can be optionally removed by a rubber roller, a sponge, an air knife, a rubber wiper blade, or other suitable devices.

The polyfunctional acyl halide may be dissolved in a nonpolar solvent to form a nonpolar mixture. Nonpolar solvents used herein should be capable of dissolving the polyfunctional acyl halide and are immiscible with the aforementioned polar solvent (e.g. water). Non-limiting examples of the apolar solvent include $C_5$-$C_7$ hydrocarbons such as pentane, cyclopentane, hexane, cyclohexane, benzene, and toluene, $C_8$-$C_{24}$ hydrocarbons, and mixtures thereof. In a preferred embodiment, the nonpolar solvent used herein is hexane. The nonpolar mixture may comprise about 0.01-10 wt %, about 0.05-5 wt %, about 0.1-1 wt % of the polyfunctional acyl halide relative to a total weight of the nonpolar mixture.

The aforementioned diamine coated support layer may be contacted, for example, by immersing, dipping, spraying, or vapor deposition, with the nonpolar mixture and allowed to remain in place for a period from about 5 seconds to about 10 minutes, preferably about 20 seconds to about 6 minutes, more preferably about 1 to about 3 minutes, or about 2 minutes. Typically, a nonpolar liquid (e.g. hexane) is immiscible with a polar liquid (e.g. water), so that the reaction can occur at the interface between the two phases. Preferably, interfacial polymerization occurs at the interface between the polar mixture phase comprising the diamine mixture and the nonpolar mixture phase comprising the polyfunctional acyl halide, thereby forming the selective layer on a surface of the porous support layer.

The resulting crude membrane may be washed thoroughly with a nonpolar solvent, such as hexane, and dried in an oven, preferably in a muffle furnace at a temperature of 50-120° C., 55-100° C., 60-90° C., or about 75° C. for 30 seconds to 30 minutes, 1-15 minutes, 3-10 minutes, or about 5 minutes, thereby forming the multi-layer membrane.

The examples below are intended to further illustrate protocols for preparing, characterizing, and utilizing the multi-layer membrane, and are not intended to limit the scope of the claims.

Example 1

Membrane preparation: polysulfone (PSF) support The polysulfone support was fabricated by the wet phase inversion technique. Prior to the membrane preparation, PSF pellets were dried overnight at 100° C. in a vacuum oven to remove the moisture from the polymer. The dried PSF pellets were mixed with polyvinylpyrrolidone (PVP) powder and then dissolved in N-methyl-2-pyrrolidone (NMP) via continuous stirring using a magnetic stirrer at 45° C. for 24 h. The polymeric solution (see Table 1 for detailed composition) was then degassed at room temperature for 24 h to remove air. The degassed polymeric solution was cast onto a polyester non-woven fabric (Novatexx 2484) using a micrometer adjustable doctor blade to obtain a support membrane with a thickness of 300 µm. Then, the support membrane was immediately immersed in distilled water bath for 24 h.

TABLE 1

Composition of the polymeric solution

| Component | Concentration (%) |
| --- | --- |
| PSF Pellets | 15 |
| PVP | 0.5 |
| NMP | 84.5 |

Example 2

Membrane Preparation: Selective Layer of the Membrane

The selective layer of the membrane was prepared by reacting the double diamine mixture (4,7,10-trioxa-1,13-tridecanediamine (TTDA), piperazine (PIP), 100 mL water) with trimesoyl chloride (TMC) in hexane (0.2 g TMC in 100 mL hexane) on top of the polysulfone support layer.

Specifically, the previously prepared polysulfone (PSF) support was saturated with the double diamine mixture solution for 10 minutes. Then, a rubber roller was used to remove the excess solution. Subsequently, the PSF support was immersed in the TMC solution (0.2% w/v) for 2 minutes, and then rinsed with pure hexane to remove the unreacted TMC. Finally, the membrane was dried in a muffle furnace at 75° C. for 5 min and stored in distilled water.

Example 3

Membrane Testing

Permeate flux and rejection of the membrane was measured using a cross flow setup with an effective membrane area of 20 cm² at different operating temperatures and pressures. The cross-flow apparatus (FIG. 1) consists of a permeation cell (CF016, Sterlitech), a high pressure pump (M03, Hydra-Cell), pressure gauges, and flow control valves (Swagelok). The salt concentration was monitored by a conductivity meter (Hanna Instruments).

Initially, the membrane was compacted for at least one hour at 20 bar using distilled water. Then, magnesium sulfate (or sodium chloride) was introduced at a concentration of 1000 ppm and left for one hour to reach a steady state at which the permeate flow and concentration were measured.

Example 4

Results and Discussion

As shown in Table 2, the mass percentage of TTDA in the double diamine solution was varied from 0 to 100 (e.g. 0, 25, 50, 75, 100) for preparing different membranes. The surface morphology of all membranes was examined using a Scanning Electron Microscope (SEM) (see FIGS. 2A-E). It was observed that the membrane became denser as the mass percentage of TTDA was increased. It was observed that the membrane made from 100% TTDA was very smooth (FIG. 2E), indicating a dense membrane. This dense membrane demonstrated a low permeate flux and high salt rejection, as shown by the results in Table 1 (100% TTDA).

Tests were performed on the corresponding membranes to determine the permeate flux and rejection under (i) pure water feed, (ii) MgSO₄ feed (1000 ppm), and (iii) NaCl feed (1000 ppm), respectively at 20 bar, 23° C.

The largest pure water flux was obtained with the membrane prepared using the double diamine solution with 25 wt % TTDA. The membrane prepared using the double diamine solution with 50 wt % TTDA demonstrated the highest sulfate rejection of 96%, as well as a permeate flux of 53 LMH, which is much greater than commercial membranes. In addition, the membrane prepared using the double diamine solution with 50 wt % TTDA showed moderate rejection of NaCl (37%), making the membrane an excellent candidate for sulfate removal applications.

TABLE 2

Flux and salt rejection of the membranes with different TTDA concentrations

| Membrane # | TTDA % | Pure Water Flux (LMH) | MgSO₄ Flux (LMH) | MgSO₄ Rejection (%) | NaCl Flux (LMH) | NaCl Rejection (%) |
|---|---|---|---|---|---|---|
| 1 | 0 | 158 | 111 | 80 | 126 | 32 |
| 2 | 25 | 195 | 94 | 74 | 165 | 27 |
| 3 | 50 | 55 | 53 | 96 | 53 | 37 |
| 4 | 75 | 29 | 24 | 82 | 26 | 66 |
| 5 | 100 | 26 | 16 | 80 | 24 | 68 |

Operating conditions: pressure = 20 bar, temperature = 23° C., MgSO₄ concentration: 1000 ppm, NaCl concentration: 1000 ppm.

The impact of pressure on the membrane performance was evaluated at 20, 30, and 40 bar, respectively at the same temperature of 23° C. and 1000 ppm MgSO₄. As shown in Table 3, the permeate flux of the membrane increased with increasing pressure, while the sulfate rejection decreased with increasing pressure.

The impact of temperature on the membrane performance was also evaluated (Table 4). The permeate flux of the membrane increased with increasing temperature, while the sulfate rejection decreased with increasing temperature.

Table 3 Effect of operating pressure on permeate flux and salt rejection of the membrane with

TABLE 3

Effect of operating pressure on permeate flux and salt rejection of the membrane with 25% TTDA

| | MgSO₄ | |
| Pressure (bar) | Flux (LMH) | Rejection (%) |
|---|---|---|
| 20 | 94 | 74 |
| 30 | 162 | 53 |
| 40 | 270 | 35 |

Operating conditions: temperature = 23° C., 1000 ppm MgSO₄ feed.

Table 4 Effect of feed temperature on permeate flux and salt rejection of the membrane with

TABLE 4

Effect of feed temperature on permeate flux and salt rejection of the membrane with 25% TTDA

| | MgSO₄ | |
| Temperature (° C.) | Flux (LMH) | Rejection (%) |
|---|---|---|
| 23 | 94 | 74 |
| 30 | 118 | 74 |
| 41 | 219 | 43 |
| 52 | 276 | 42 |

Operating conditions: P = 20 bar, 1000 ppm MgSO₄ feed.

Example 5

In summary, a new nanofiltration membrane was developed for sulfate removal from water. The membrane was prepared via reacting double diamine monomers in an aqueous phase and trimesoyl chloride (TMC) in an organic phase. Specifically, a selective top layer was synthesized by reacting a mixture of diamines (4,7,10-trioxa-1,13-tridecanediamine (TTDA) and piperazine (PIP)) with TMC at the surface of polysulfone (PSF) support. The mass percentage of TTDA in the double diamine solution was changed from 0 to 100% to prepare different membranes.

The properties of the prepared membrane were characterized using SEM, TGA, FTIR, and a cross-flow filtration setup. The membrane prepared using the double diamine solution with 25 wt % TTDA was found to possess high permeate flux (94 L/(m²·h) (LMH)) and good sulfate rejection (74%).

The invention claimed is:

1. A doubly porous multi-layer desal membrane, comprising:
    a porous support layer comprising a polysulfone; and
    a macroporous selective layer wherein at least 50% of the pores of the macroporous selective layer are unconnected;
    wherein the macroporous selective layer comprising a polyamide comprising as reacted units a polyfunctional acyl halide having at least two acyl halide groups, 4,7,10-trioxa-1,13-tridecanediamine and a cyclic diamine of formula (I)

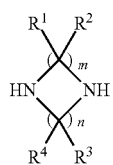

wherein:
    $R^1$, $R^2$, $R^3$, and $R^4$ are each independently selected from the group consisting of a hydrogen, an optionally substituted alkyl, an optionally substituted cycloalkyl, an optionally substituted arylalkyl, and an optionally substituted aryl;
    m and n are each independently 2 or 3;
    a weight ratio of the 4,7,10-trioxa-1,13-tridecanediamine to the cyclic diamine (I) in the polyamide is in a range of 1:5 to 2:1; and
    the macroporous selective layer is disposed on at least a portion of a surface of the porous support layer.

2. The doubly porous multi-layer desal membrane of claim 1, wherein the polysulfone is a polysulfone (PSU) and/or a polyethersulfone (PES).

3. The doubly porous multi-layer desal membrane of claim 1, wherein the porous support layer further comprises polyvinylpyrrolidone.

4. The doubly porous multi-layer desal membrane of claim 3, wherein a weight ratio of the polysulfone to polyvinylpyrrolidone is in a range of 10:1 to 50:1.

5. The doubly porous multi-layer desal membrane of claim 1, wherein the polyfunctional acyl halide is a polyfunctional acyl chloride.

6. The doubly porous multi-layer desal membrane of claim 1, wherein the polyfunctional acyl halide is at least one selected from the group consisting of trimesoyl chloride, 1,2,4-benzenetricarbonyl trichloride, 1,2,4,5-benzenetetracarbonyl tetrachloride, isophthaloyl chloride, terephthaloyl chloride, and [1,1'-biphenyl]-4,4'-dicarbonyl dichloride.

7. The doubly porous multi-layer desal membrane of claim 1, wherein the polyfunctional acyl halide is trimesoyl chloride.

8. The doubly porous multi-layer desal membrane of claim 1, wherein m and n are 2.

9. The doubly porous multi-layer desal membrane of claim 1, wherein the cyclic diamine is piperazine.

10. The doubly porous multi-layer desal membrane of claim 1, wherein the macroporous selective layer has pores with an average diameter in a range of 1-500 nm.

11. The doubly porous multi-layer desal membrane of claim 1, wherein the porous support layer has a thickness of 20-1,000 μm.

12. The doubly porous multi-layer desal membrane of claim 1, which has a water flux of 53-300 $Lm^{-2}h^{-1}$, determined by exposing the multi-layer membrane to water at a temperature of 4-60° C., and a transmembrane pressure of 5-60 bar.

13. The doubly porous multi-layer desal membrane of claim 1, which has a chloride salt rejection of 30-75%, determined by exposing the multi-layer membrane to water containing 500-5,000 ppm chloride salt at a temperature of 4-60° C., and a transmembrane pressure of 5-60 bar.

14. The doubly porous multi-layer desal membrane of claim 1, which has a sulfate salt rejection of 70-99.5%, determined by exposing the multi-layer membrane to water containing 500-5,000 ppm sulfate salt at a temperature of 4-60° C., and a transmembrane pressure of 5-60 bar.

* * * * *